US011403133B1

United States Patent
Schmalzle et al.

(10) Patent No.: US 11,403,133 B1
(45) Date of Patent: Aug. 2, 2022

(54) SYSTEM AND METHOD FOR MANAGING REQUEST-TO-TASK TRANSLATION AND SEQUENCING

(71) Applicant: Groupon, Inc., Chicago, IL (US)

(72) Inventors: Edward Schmalzle, Baltimore, MD (US); Phillip Sasser, Baltimore, MD (US); Nicholas Pellegrini, Baltimore, MD (US); Ross Moulton, Baltimore, MD (US)

(73) Assignee: GROUPON, INC., Chicago, IL (US)

( * ) Notice: Subject to any disclaimer, the term of this patent is extended or adjusted under 35 U.S.C. 154(b) by 696 days.

(21) Appl. No.: 15/280,220

(22) Filed: Sep. 29, 2016

Related U.S. Application Data (60) Provisional application No. 62/235,506, filed on Sep. 30, 2015.

(51) Int. Cl.
*G06F 9/46* (2006.01)
*G06F 9/48* (2006.01)
*H04L 43/10* (2022.01)

(52) U.S. Cl.
CPC .......... *G06F 9/485* (2013.01); *G06F 9/4881* (2013.01); *H04L 43/10* (2013.01)

(58) Field of Classification Search
CPC ......... G06F 9/485; G06F 9/4881; H04L 43/10
See application file for complete search history.

(56) References Cited

U.S. PATENT DOCUMENTS

| | | | | |
|---|---|---|---|---|
| 8,442,758 B1* | 5/2013 | Rovik | ................. | G01C 21/343 701/424 |
| 2008/0275643 A1* | 11/2008 | Yaqub | ................. | G01C 21/343 701/412 |
| 2013/0145299 A1* | 6/2013 | Steimle | ................. | G16H 10/40 715/771 |
| 2014/0164126 A1* | 6/2014 | Nicholas | ................ | G06Q 30/08 705/14.58 |
| 2015/0262121 A1* | 9/2015 | Riel-Dalpe | ............ | G06Q 50/12 705/15 |
| 2015/0278759 A1* | 10/2015 | Harris | .............. | G06Q 10/08355 705/338 |
| 2017/0140326 A1* | 5/2017 | Rhyu | ................... | G06Q 10/083 |

* cited by examiner

*Primary Examiner* — Tammy E Lee
(74) *Attorney, Agent, or Firm* — Alston & Bird LLP (57) ABSTRACT

An apparatus, method, and computer program product are provided to translate request data objects into ordered sequence of tasks to be performed by network response assets and related systems to allow for the efficient movement of network resources and other resources in high-volume network environments. In some example implementations, otherwise unrelated request data objects and related parameters are interleaved into an ordered sequence of tasks, and a renderable object associated therewith is provided to a user interface of a mobile system associated with a network response asset. Location information such as triangulated position information associated with one or more mobile devices, along with other system characteristics may be used to ascertain system status and otherwise effectuate request translation.

17 Claims, 5 Drawing Sheets

SYSTEM AND METHOD FOR MANAGING REQUEST-TO-TASK TRANSLATION AND SEQUENCING

CROSS-REFERENCE TO RELATED APPLICATIONS

The present application claims the benefit of U.S. Provisional Patent Application Ser. No. 62/235,506 which was filed on Sep. 30, 2015 and titled METHODS AND SYSTEMS FOR MANAGING DISPATCH OBJECTS, the entire content of which is incorporated by reference herein for all purposes.

TECHNICAL FIELD

An example embodiment relates generally to routing systems that enable the dispatching of network resources in response to request objects received by a network system. Example implementations are directed to the efficient sequencing of operations associated with the transport of resources from one location to another in response to request objects received by a network system, including the interleaving and sequencing of operations associated with independent request objects

BACKGROUND

Many individuals, industries, networks, and other operations have become increasingly dependent on the carefully coordinated access, acquisition, activation, and delivery of necessary resources. Legacy approaches to resource acquisition and deployment typically rely on the maintenance of a stored reserve of materials and/or other resources that can be drawn on over time and periodically replenished. However, the maintenance and preservation such reserves introduce numerous inefficiencies. Modern approaches seek to leverage the efficiencies associated with accessing and acquiring resources only shortly before they are needed and/or bringing additional resources online to temporarily increase capacity, but risk system idle and/or system failure if necessary resources are not received in time.

This shift to a reliance on highly time-sensitive resource acquisition has created a number of technical challenges associated with the timely movement of resources that must be physically moved from one location to another within a relatively short timeframe. Legacy approaches to resource delivery involving the periodic delivery of resources along a set route are generally incapable of meeting highly restrictive timing constraints. As such, there is a widespread need for systems that enable the efficient deployment and delivery of resources in a manner that is able to meet highly-restrictive time constraints.

BRIEF SUMMARY

An apparatus, computer program product, and method are therefore provided in accordance with an example embodiment in order to identify and order tasks to be undertaken by a network response asset and/or a related system in order to meet the requirements of a request data object. In this regard, the method, apparatus and computer program product of an example embodiment provide for generating a set of ordered tasks based on extracted request parameters, such as locations associated with the request, timing constraints, and additional instructions associated with the request data object, and causing an indication of the ordered list to be rendered on the display of a mobile device associated with the a network response asset. Moreover, the method, apparatus, and computer program product of an example embodiment provide for the iteration and/or updating of the ordered set of tasks based on input received from the mobile device, such as triangulation location information, as we all as forming an interleaved set of tasks based at least in part on the parameters associated with multiple, independent request data objects.

In an example embodiment, an apparatus is provided, the apparatus comprising a processor and a memory, the memory comprising instructions that configure the apparatus to: receive a first request data object; extract from the first request data object a first set of request parameters, wherein the first set of request parameters comprises: a first location identification, wherein the first location identification is associated with a requested intermediate destination, a set of request instructions associated with the requested intermediate destination, and a second location identification, wherein the second location identification is associated with a requested target destination; determine, based at least in part on the first set of request parameters, a first ordered set of tasks to be performed by a system associated with a network response asset; generate a first control signal causing an indication of the first ordered set of tasks to be displayed on a user interface of a mobile device associated with the network response asset; receive from the mobile device associated with the network response asset a set of response asset input data; determine, based at least in part on the response asset input data and the set of request parameters, a second ordered set of tasks to be performed by the system associated with the network response asset; and generate a control signal causing an indication of the second ordered set of tasks to be displayed on the user interface of the mobile device associated with the network response asset.

In some example implementations of such an apparatus, the set of response asset input data comprises a triangulation location of the mobile device associated with the network response asset. In some example implementations of such an apparatus, the set of response asset input data comprises an indication of a gestural input received by the mobile device associated with the network response asset. In some example implementations, the first set of request parameters further comprises a timing parameter associated with the intermediate destination and a timing parameter associated with the target destination.

In some example implementations of such an apparatus, the memory further comprises instructions that configure the apparatus to: receive a second request data object; extract from the second request data object a second set of request parameters; and determine, based at least in part on the second set of request parameters, an ordered set of tasks associated with the second request data object to be performed by the system associated with the network response asset.

In some such example implementations, and in other example implementations, the memory further comprises instructions that configure the apparatus to: determine an interleaved set of ordered tasks to be performed by the system associated with the network response asset, wherein the interleaved set of tasks comprises at least a portion of the first ordered set of tasks and at least a portion of the set of tasks associated with the second request; and generate a control signal causing an indication of the interleaved set of tasks to be displayed on the user interface of the mobile device associated with the network response asset.

In some such example implementations, and in other example implementations, generating the control signal causing an indication of the interleaved set of tasks to be displayed on the user interface of the mobile device associated with the network response asset comprises causing an indication of a task associated with the first request data object to be rendered in a first color and causing an indication of a task associated with the second request data object to be rendered in a second color.

In another embodiment, a computer program product is provided, the computer program product comprising at least one non-transitory computer-readable storage medium having computer-executable program code instruction stored therein, the computer-executable program code instructions comprising program code instructions configured to: receive a first request data object; extract from the first request data object a first set of request parameters, wherein the first set of request parameters comprises: a first location identification, wherein the first location identification is associated with a requested intermediate destination, a set of request instructions associated with the requested intermediate destination, and a second location identification, wherein the second location identification is associated with a requested target destination; determine, based at least in part on the first set of request parameters, a first ordered set of tasks to be performed by a system associated with a network response asset; generate a first control signal causing an indication of the first ordered set of tasks to be displayed on a user interface of a mobile device associated with the network response asset; receive from the mobile device associated with the network response asset a set of response asset input data; determine, based at least in part on the response asset input data and the set of request parameters, a second ordered set of tasks to be performed by the system associated with the network response asset; and generate a control signal causing an indication of the second ordered set of tasks to be displayed on the user interface of the mobile device associated with the network response asset.

In some example implementations, the set of response asset input data comprises a triangulation location of the mobile device associated with the network response asset. In some such example implementations, and in other example implementations, the set of response asset input data comprises an indication of a gestural input received by the mobile device associated with the network response asset. In some example implementations, the first set of request parameters further comprises a timing parameter associated with the intermediate destination and a timing parameter associated with the target destination.

In some example implementations, the computer-executable program code instructions further comprise program code instructions configured to: receive a second request data object; extract from the second request data object a second set of request parameters; and determine, based at least in part on the second set of request parameters, an ordered set of tasks associated with the second request data object to be performed by the system associated with the network response asset.

In some such example implementations, and in other example implementations, the computer-executable program code instructions further comprise program code instructions configured to: determine an interleaved set of ordered tasks to be performed by the system associated with the network response asset, wherein the interleaved set of tasks comprises at least a portion of the first ordered set of tasks and at least a portion of the set of tasks associated with the second request; and generate a control signal causing an indication of the interleaved set of tasks to be displayed on the user interface of the mobile device associated with the network response asset. In some such example implementations, and in other example implementations, generating the control signal causing an indication of the interleaved set of tasks to be displayed on the user interface of the mobile device associated with the network response asset comprises causing an indication of a task associated with the first request data object to be rendered in a first color and causing an indication of a task associated with the second request data object to be rendered in a second color.

In another embodiment, and method for managing request data objects is provided, the method comprising: receiving a first request data object; extracting from the first request data object a first set of request parameters, wherein the first set of request parameters comprises: a first location identification, wherein the first location identification is associated with a requested intermediate destination, a set of request instructions associated with the requested intermediate destination, and a second location identification, wherein the second location identification is associated with a requested target destination; determining, based at least in part on the first set of request parameters, a first ordered set of tasks to be performed by a system associated with a network response asset; generating a first control signal causing an indication of the first ordered set of tasks to be displayed on a user interface of a mobile device associated with the network response asset; receiving from the mobile device associated with the network response asset a set of response asset input data; determining, based at least in part on the response asset input data and the set of request parameters, a second ordered set of tasks to be performed by the system associated with the network response asset; and generating a control signal causing an indication of the second ordered set of tasks to be displayed on the user interface of the mobile device associated with the network response asset.

In some example implementations, the set of response asset input data comprises a triangulation location of the mobile device associated with the network response asset. In some such example implementations, and in other example implementations, the set of response asset input data comprises an indication of a gestural input received by the mobile device associated with the network response asset. In some such example implementations, and in other example implementations, the first set of request parameters further comprises a timing parameter associated with the intermediate destination and a timing parameter associated with the target destination.

In some example implementations, the method further comprises receiving a second request data object; extracting from the second request data object a second set of request parameters; and determining, based at least in part on the second set of request parameters, an ordered set of tasks associated with the second request data object to be performed by the system associated with the network response asset. In some such example implementations, and in other example implementations, the method further comprises: determining an interleaved set of ordered tasks to be performed by the system associated with the network response asset, wherein the interleaved set of tasks comprises at least a portion of the first ordered set of tasks and at least a portion of the set of tasks associated with the second request; and generating a control signal causing an indication of the interleaved set of tasks to be displayed on the user interface of the mobile device associated with the network response asset, wherein generating the control signal causing an indication of the interleaved set of tasks to be displayed on the user interface of the mobile device associated with the network response asset comprises causing an indication of a task associated with the first request data object to be rendered in a first color and causing an indication of a task associated with the second request data object to be rendered in a second color.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein, a "request data object" or "request object" is any data object that contains a request from a user or other entity for access to and/or use of system resources and an indication of the requirements and/or other parameters associated with the request.

As used herein, a "network response asset" is a finite network asset that may be paired with a request data object and is capable of providing network or other system resources in response to the request data object, and/or causing, through the interaction with other systems, the deployment of network and/or other system resources to fulfill the requirements and other parameters of a request data object.

Figure 1:
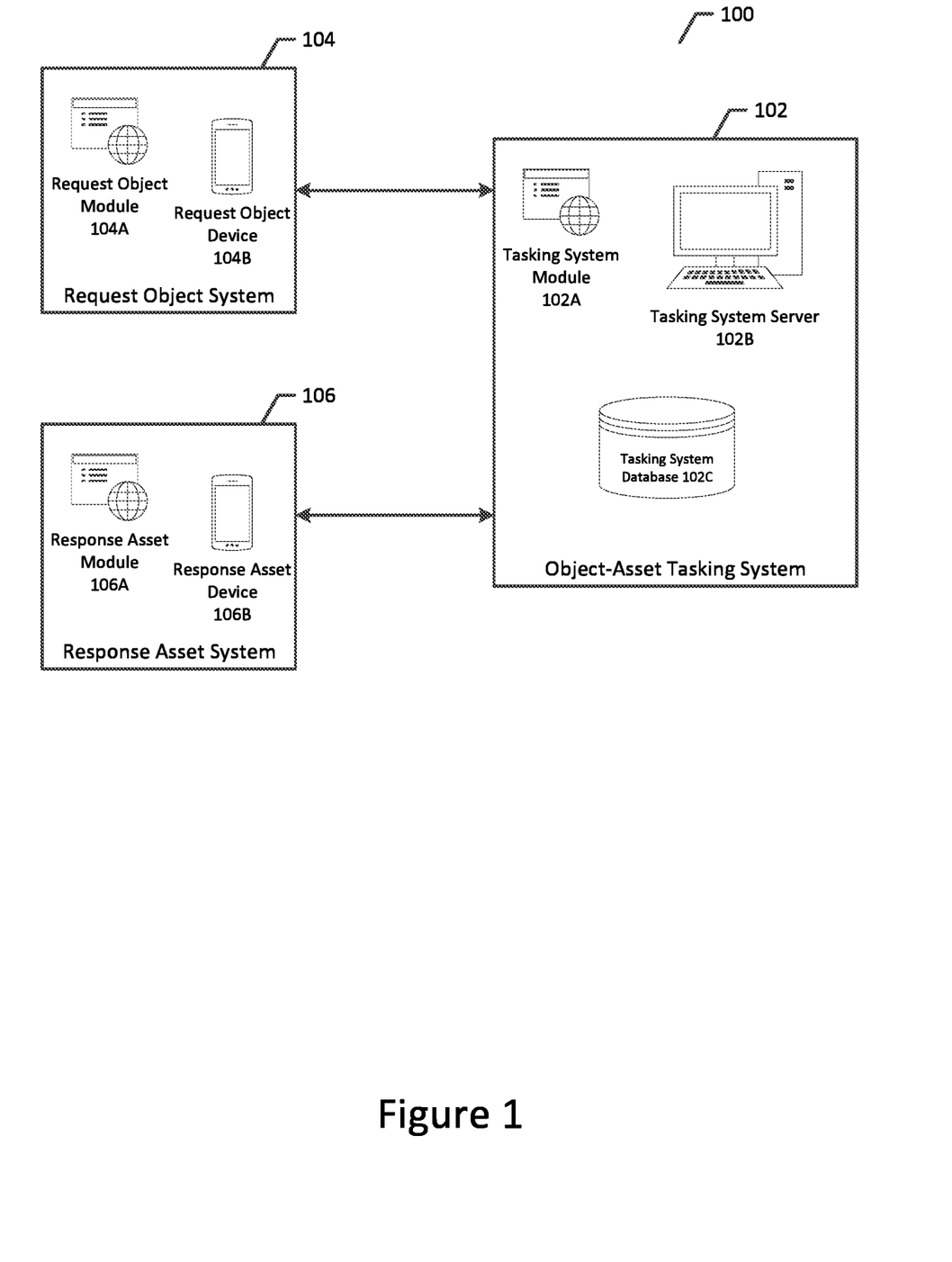
FIG. 1 depicts an example system environment in which implementations in accordance with an example embodiment of the present invention may be performed.

Turning now to the Figures, FIG. 1 shows an example system environment 100 in which implementations involving the efficient generation of ordered sets of tasks to be undertaken in connection with responding to request data objects. The depiction of environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Embodiments implemented in a system environment such as system environment 100 advantageously provide for the generation of one or more ordered sets of tasks associated with a request data object and communication with mobile devices and/or other systems associated with network response assets through, for example, the receipt of one or more request data objects, the extraction of request parameters from the request data object(s), the generation of one or more control signals causing an indicated of the generated ordered sets of tasks to be displayed on the user interface of a mobile device associated with a network response asset, and the receipt of response asset input data. Some such embodiments leverage a hardware and software arrangement or environment for request data object-to-network response asset pairing in accordance with the present invention.

As shown in FIG. 1, an object-asset tasking system 102 includes an online tasking system module 102A which is configured to receive, process, transform, transmit, communicate with and evaluate request data objects, network response assets, and data and systems associated therewith via a web server, such as tasking system server 102B. The tasking system server 102B is connected to any of a number of public and/or private networks, including but not limited to the Internet, the public telephone network, and/or networks associated with particular communication systems or protocols, and may include at least one memory for storing at least application and communication programs.

It will be appreciated that all of the components shown FIG. 1 may be configured to communicate over any wired or wireless communication network including a wired or wireless local area network (LAN), personal area network (PAN), metropolitan area network (MAN), wide area network (WAN), or the like, as well as interface with any attendant hardware, software and/or firmware required to implement said networks (e.g. network routers and network switches). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to TCP/IP based networking protocols may be used in connection with system environment 100 and embodiments of the invention that may be implemented therein or participate therein.

As shown in FIG. 1, object-asset tasking system 102 also includes a tasking database 102C that may be used to store information associated with request data objects, network response assets, and/or information related to the tasking of network response assets to fulfill the requirements associated with a request data object, which can be accessed by the tasking system module 102A and/or the tasking system server 102B. While FIG. 1 depicts tasking system database 102C as a single structure, it will be appreciated that tasking system database 102C may additionally or alternatively be implemented to allow for storage in a distributed fashion and/or at facilities that are physically remote from the each other and/or the other components of object-asset tasking system 102.

Request data objects and/or additional information to be associated with one or more request data objects may originate from a client system such as request object system 104. A user of request object system 104 may use a request object device 104B, such as a laptop computer, desktop computer, or mobile device, for example, to interface with a request object module 104A to generate a request data object and/or information to be included in a request data object, such as instruction associated with the request data object, intermediate and/or target destinations associated with the request object, and/or other information to be conveyed from a user as part of a request for a response to be conveyed to an object-asset pairing system, such as object-asset pairing system 102. In some example implementations, such as those that arise in contexts and situations where users seek to have goods, materials, and/or other resources delivered from one location to another, a request object system such as request object system 104 may take the form of, or be incorporated into, a user's mobile device which is configured to accept request information, such as an order for food from a restaurant, and transmit that information in the form of a request data object to a tasking system.

While only one request object system 104 is depicted in FIG. 1 in the interest of clarity, it will be appreciated that numerous other such systems may be present in system environment 100, permitting numerous users to develop and transmit request data objects to the object-asset pairing system 102

As shown in FIG. 1, system environment 100 also includes response asset system 106, which comprises a response asset module 106A and a response asset device 106B. While only one response asset system 106 is depicted in FIG. 1 in the interest of clarity, it will be appreciated that numerous additional such systems may be present in system environment 100, permitting numerous, distributed network response assets to be paired with request data objects and fulfill the requests contained therein. Response asset device may comprise and/or incorporate a laptop computer, desktop computer, mobile device, or the like, for example, and is configured to interface with a response asset module 106A to interact with object-asset tasking system 102 to receive and operate on a set of ordered tasks associated with the fulfillment of the request(s) associated with one or more request data objects that have been paired with the network response asset. The response asset system 106 is also capable of communicating with object-asset tasking system 102 to provide information that the object-asset tasking system 102 may need when determining the status of the response asset system, such as a location of the response asset system, and whether the response asset system has completed any of the tasks displayed on the user interface of the response asset device 106B. For example, response asset system 106 may, such as via the capabilities of response asset device 106B ascertain the location of response asset system 106 through the use of a global positioning system (GPS) interface, cellular location protocols, and/or other location protocols that involve triangulating and/or otherwise determining a position of response asset device 106B and/or other components associated with response asset system 106. In some example implementations, such as those that arise in contexts or situations involving the delivery of goods, materials, and/or other resources, for example, the response asset system may include and/or be incorporated into a vehicle.

Overall, and as depicted in system environment 100, object-asset tasking system 102 engages in machine-to-machine communication with request object system 104 and response asset system 106, via one or more networks, to facilitate the processing of request data objects received from the request object system 104, the determination of one or more ordered sets of tasks associated with the received data objects, the generation of a control signal causing an indication associated with the ordered list(s) to be displayed on a mobile device, the receipt of input data from the response asset system, and adjustment of the ordered sets of tasks and their related displays based on such input data.

Figure 2:
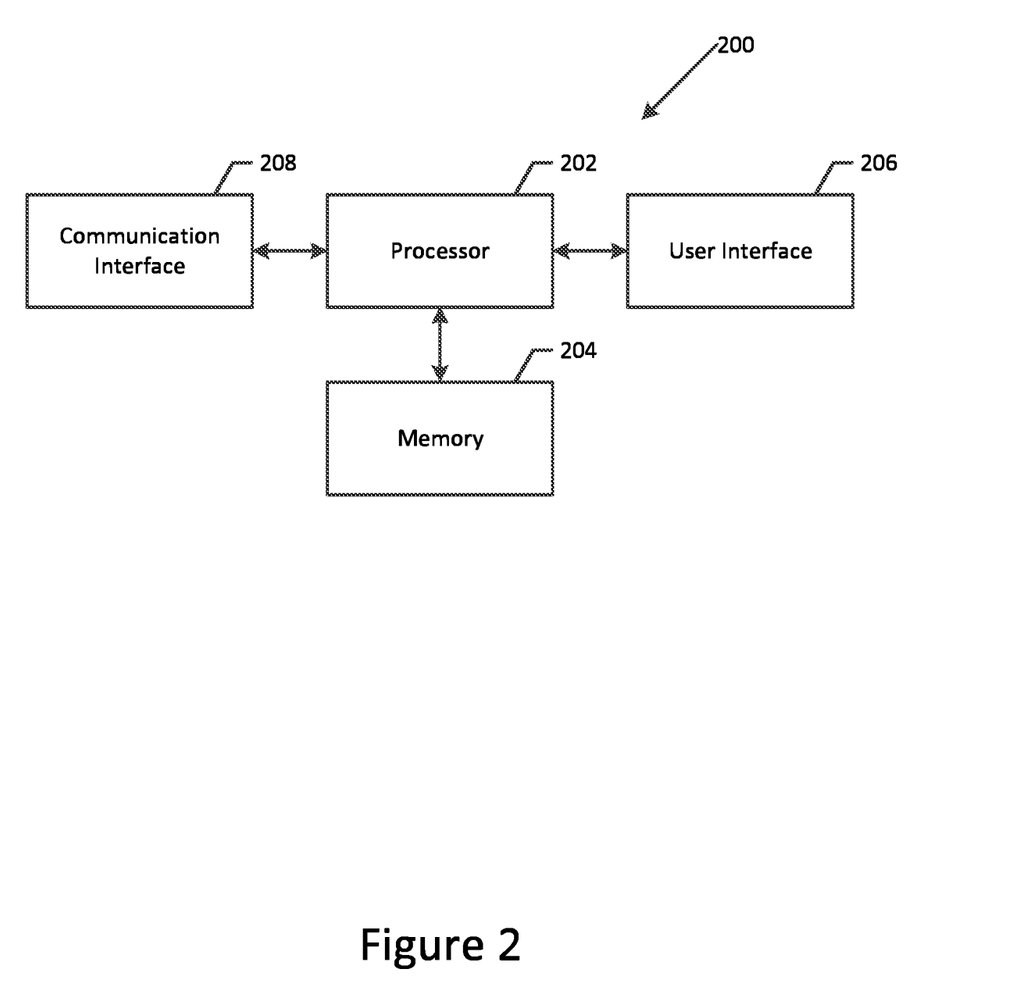
FIG. 2 is a block diagram of an apparatus that may be specifically configured in accordance with an example embodiment of the present invention.

Based upon the parameters associated with a request data object and input from systems associated with a corresponding network response asset, an ordered set of tasks to be used in satisfying the requirements of a request contained in a request data object may be generated and conveyed to a mobile device associated with a network response asset. In this regard, a request data object may and input data from a systems associated with a network response asset may be processed and operated on by an apparatus 200 as depicted in FIG. 2. The apparatus may be embodied by the object-asset tasking system 102, or any of the components shown or otherwise contemplated therein, any of the other devices discussed with respect to FIG. 1, and/or any other devices that may be incorporated or otherwise associated with environment 100. Alternatively, the apparatus 200 may be embodied by another computing device, external to such devices. For example, the apparatus may be embodied by a personal computer, a computer workstation, a server or the like, or by any of various mobile computing devices, such as a mobile terminal, e.g., a smartphone, a tablet computer, etc.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 204, and/or the like).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3:
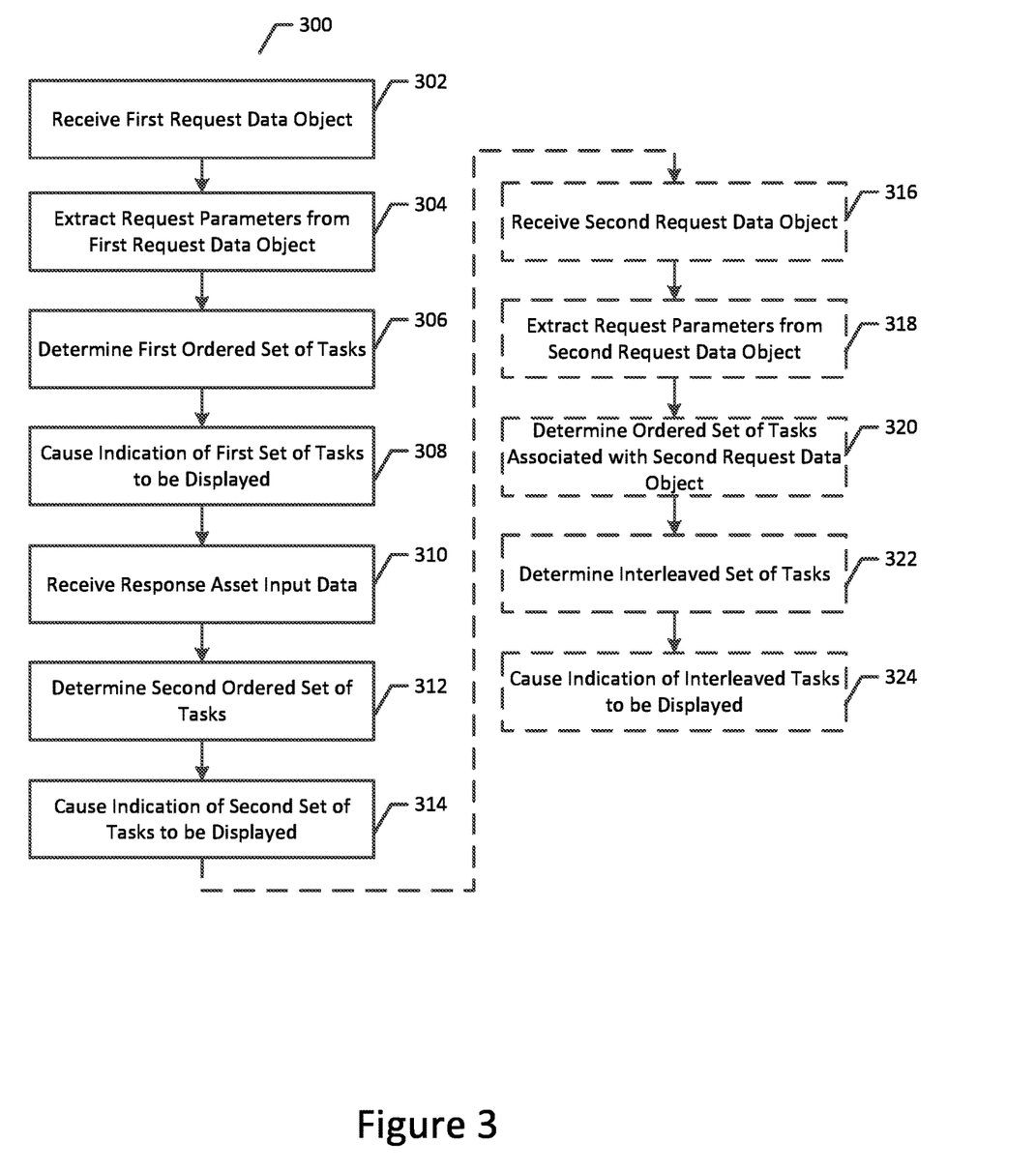
FIG. 3 is a flowchart illustrating a set of operations performed, such as by the apparatus of FIG. 2, in accordance with an example embodiment of the present invention.

FIG. 3 is a block diagram illustrating a set of operations 300 performed, such as by the apparatus of FIG. 2, in accordance with an example embodiment of the present invention. It will be appreciated that the apparatus 200, through the operation of the processor 202, memory 204, user interface 206, communication interface 208, and/or any other components used in connection therewith, are capable of performing each of the operations described herein with respect to FIG. 3 and depicted or otherwise contemplated therein.

Many example implementations of the apparatus 200, the operations 300, and/or other embodiments of the invention are particularly advantageous in contexts where the parameters and/or other requirements of a request data object require the physical transport of materials and/or other resources from one geographic location to another within limited time constraints. In generating an ordered set of tasks to be performed by a system associated with a network response asset, such implementations are aimed at sequencing the tasks associated with the fulfillment of the requirements of the request data object in the most efficient manner available. For example, one or more individuals may use their respective mobile devices to enter orders for food to be delivered from one or more restaurants. In such situations, the mobile devices may be equipped with particular application software to handle the intake of such orders and/or otherwise operate as a request object system. Upon receipt of the orders contained in a request data object, the receiving system, which may be dispatching system or other system configured to function as an object-asset tasking system, may process the request data objects and provide a set of tasks to a network response asset system, such as a vehicle equipped with a mobile device and/or other equipment capable of interfacing with the object-asset tasking system and otherwise configured to act in fulfillment of the one or more of the requirements of associated with the order and its related request data object.

As such, and as shown at block 302, the apparatus 200 is capable of receiving a first request data object. As discussed elsewhere herein, a request data object is any data object that contains a request from a user or other entity for access to and/or use of system resources and an indication of the requirements and/or other parameters associated with the request. Some example implementations of block 302 arise in contexts where the system resources include, but are not necessarily limited to, requests that a system associated with a network response agent be used to transport goods, materials, and/or other resources from one location to another, so as to effectuate a timely delivery of such goods, materials, and/or other resource to a particular locations. In some such example implementations, a request data object may be transmitted by a mobile device associated with a user, such as request object device 104B shown in FIG. 1, or the like, directly to the apparatus 200 and/or indirectly, such as through an object-asset tasking system, such as object-asset tasking system 102, that may be associated with the apparatus 200. Any approach to generating a request data object and any approach to receiving such a request data object may be used in connection with implementations of block 302.

As shown at block 304, the apparatus 200 is also capable of extracting from the first request data object a first set of request parameters. Implementations of block 304 contemplate request data objects that include one or more request parameters. Such request parameters may include, but are not limited to, information describing the requirements of the request associated with the request data object, an individual or entity that initiated or is otherwise associated with the request, particularized instructions associated with the request, one or more locations associated with the request, one or more times and/or timing constraints associated with the request, and/or any other information that relates to the request data object, the request reflected therein, and/or the characteristics of the request data object.

In some particularly advantageous implementations that involve the movement of resources from one location to another, the first set of request parameters includes, for example, a first location identification, wherein the first location identification is associated with a requested intermediate destination. As used herein, the term "intermediate destination" may refer to a location associated with a request data object that is not the delivery point (i.e., the target destination) associated with the request data object. In many implementations, an intermediate destination is a location at which goods, materials, and/or other resources must be acquired in connection with fulfilling the requirements associated with a request data object. In many example implementations, the identification of such an intermediate destination takes the form of coordinates, address information, and/or other location data. However, it will be appreciated that any approach to identifying a location may be used in implementations of block 304.

In some such advantageous implementations, the first set of request parameters also includes a set of request instructions associated with the requested intermediate destination. As noted above, some implementations of block 304 involve acquiring resources from an intermediate destination and/or otherwise interacting with entities and systems associated with the intermediate destination. In such example implementations of block 304, the request instructions associated with the intermediate destination may include, for example, a list of items to acquire, information about protocols and/or other authorization processes to be used to gain access to the intermediate destination, parking information and/or other information associated with the intermediate destination and/or the request data object.

In some example implementations, the first set of request parameters also includes a second location identification, wherein the second location identification is associated with a requested target destination. As used herein, the term "target destination" may refer to a location associated with a request data object that constitutes the last location associated with the request data object, such as a delivery point. Any of the approaches that may be used to identify an intermediate destination, and any other approach to identifying a destination, may be used in implementations of block 304 to identify a target destination.

In some example implementations of block 304, the first set of request parameters further comprises a timing parameter associated with the intermediate destination and a timing parameter associated with the target destination. As noted herein, may example implementations of process 300 arise in the context of time-sensitive requests for resources. In some such implementations of block 304, the request parameters associated with a request data object may include a timing parameter associated with the intermediate destination, such as a time at which resources may be available for pickup and/or a time before which resources must be picked up to successfully fulfill the requirements of the request data object. Similarly, the timing constraint associated with target destination may include, for example, a time by which a delivery must be made to the target destination in order to fulfill the request. In another example implementation, the timing constraint may include a limit on the amount of time that may pass between acquiring resources at the intermediate destination and arrival at the target destination.

As shown at block 306, the apparatus 200 is also capable of determining, based at least in part on the first set of request parameters, a first ordered set of tasks to be performed by a system associated with a network response asset. Many implementations of block 306 recognize that there may be a particular sequence in which actions associated with satisfying a request in a request data object must be performed. For example, in cases involving the movement of resources from one location to another, it is necessary to acquire the requested resources, such as through a pickup operation at an intermediate destination, prior to proceeding to the target destination. In other example implementations, while there may be multiple possible sequences of actions that can be taken to fulfill the request data object, one sequence may be more efficient (i.e., it may be faster, require fewer stops, require a shorter overall travel distance, etc.) than other sequences. In implementations of block 306 that arise in the context of request data objects that require multiple actions to be taken to fulfill the request associated with the request data object, such actions may be divided and/or grouped to reflect one or more states that a system associated with a network response asset will pass through in the course of fulfilling the request associated with the request data object. These states may then be analyzed by the apparatus and/or a related system to identify required logical relationships between the states (such as particular sequences that must be followed), and/or the most efficient approach to sequencing the states and their related actions.

As shown at block 308, the apparatus 200 is also capable of generating a first control signal causing an indication of the first ordered set of tasks to be displayed on a user interface of a mobile device associated with the network response asset. Upon determining the first ordered set of tasks, the set of tasks and/or information related to those tasks, may be used to form a renderable object that can be displayed, such as on a screen of a mobile device. An example of such a user interface is discussed herein with respect to FIG. 4 below. In some example implementations, the control signal generated by the apparatus 200 and/or a related system, such as object asset tasking system 102, causes a sequenced list of steps, and/or information associated with such steps, to be displayed in order on the user interface (such as a touchscreen, for example) of a mobile device. Displayed as such, an operator of a system associated with a network response asset may be able to readily read the list and proceed in accordance with the sequenced tasks and any instructions associated therewith.

As shown at block 310, the apparatus 200 is also capable of receiving from the mobile device associated with the network response asset a set of response asset input data. Many implementations of process 300 in general, and block 310 in particular, contemplate the use of a mobile device, such as a smartphone, tablet computer, or the like, which is capable of receiving user input and/or ascertaining its position and wirelessly communicating with other devices and systems. In some example implementations of block 310, the set of response asset input data includes a triangulation location of the mobile device associated with the network response asset. In such example implementations, the mobile device may be equipped with a global positioning system (GPS) receiver and/or other hardware that allows the mobile device to interact with a GPS system, cellular network, and/or other system to triangulate a position of the mobile device. In such situations, the acquisition of a real-time or near real-time position of the mobile device and the communication of that position back to the apparatus and/or related tasking system may permit the automatic detection of when a system associated with a network response asset has arrived at one or more locations associated with a request data object, and/or otherwise engaged in the tasks associated with the request data object.

In some example implementations of block 310, the set of response asset input data comprises an indication of a gestural input received by the mobile device associated with the network response asset. As discussed in more detail in connection with FIG. 4, the user interface of the mobile device may be able to detect when an operator associated with the mobile device presses a button, touches a region of a screen, makes a swiping motion on the screen, and/or otherwise manipulates the user interface to indicate the performance of one of the sequenced tasks and/or an error condition associated therewith.

As shown at block 312, the apparatus 200 is also capable of determining, based at least in part on the response asset input data and the set of request parameters, a second ordered set of tasks to be performed by the system associated with the network response asset. As input comes in from the mobile device, some implementations of block 312 contemplate ascertaining whether tasks have been completed, whether timing constraints have been met, whether error conditions have occurred, and/or other information that may change how tasks associated with a request data object should be sequenced, and responsively creating an updated ordered set of tasks. In some situations, such as where the tasks are being readily accomplished in order, creating an updated set of tasks may include removing the completed tasks from the list. In situations where the input received from the mobile device is indicative or an error condition or other unforeseen condition, creating an updated set of task may include re-ordering one or more tasks to attempt to identify the most efficient approach to satisfying the requirements of the request data object.

As shown at block 314, the apparatus 200 is also capable of generating a control signal causing an indication of the second ordered set of tasks to be displayed on the user interface of the mobile device associated with the network response asset. As with implementations of block 308, a renderable object may be created based on the second (i.e., updated) set of tasks, and the renderable object may be presented via the display of the mobile device, such that an operator of a system associated with the relevant network response asset may be able to adjust the performance of the tasks associated with the request data object.

With reference to block 316-324, the apparatus 200 may optionally be configured to perform additional steps, including but not limited to the optional operations shown in dashed lines in FIG. 3.

As shown at block 316, the apparatus is 200 may be optionally configured to be capable of receiving a second request data object. Some example implementations of process 300 contemplate a single system associated with a network response agent performing the tasks associated with multiple request data objects. For example, in situations where multiple requests may be effectively grouped together, the receipt by a system associated with a network response asset of tasks associated with multiple request data objects may allow for the more efficient satisfaction of the multiple request data objects. It will be appreciated that any of the request data objects contemplated herein, and any approach to receiving a request data object, including but not limited to those discussed herein with respect to be block 302, may be used in implementations of block 316.

As shown at block 318, the apparatus is 200 may also be optionally configured to be capable of extracting from the second request data object a second set of request parameters. As with implementations of block 304, for example, request parameters, including but not limited to identifications of intermediate and target destinations, instructions associated therewith, timing parameters, and/or other information may be extracted from a the second request data object in example implementations of block 318.

As shown at block 320, the apparatus is 200 may also be optionally configured to be capable of determining, based at least in part on the second set of request parameters, an ordered set of tasks associated with the second request data object to be performed by the system associated with the network response asset. As with example implementations of block 306 and/or block 312, the second set of request parameters extracted from the second request data object may be used to generate an ordered set of tasks associated with the second request data object.

As shown at block 322, the apparatus is 200 may be optionally configured to be capable of determining an interleaved set of ordered tasks to be performed by the system associated with the network response asset, wherein the interleaved set of tasks comprises at least a portion of the first ordered set of tasks and at least a portion of the set of tasks associated with the second request. In some example implementations of process 300, it may be inefficient to perform all of the steps associated with one request data object prior to beginning performance of the steps associated with a second request data object. For example, multiple request data objects may have intermediate and/or target destinations that are close to each other, such that it makes sense to proceed to one intermediate destination to acquire resources for one request, and then proceed to another intermediate destination to acquire resources for a second request, prior to proceeding the respective target destinations. Similar to implementations of blocks 308, 312, and 320, the apparatus and/or a related system may analyze the steps associated with both of the request data objects and ascertain the most efficient sequence of steps that logically accomplishes the completion of the tasks associated the request data objects. In situations where tasks associated with multiple request data objects overlap, such as when they have identical intermediate and/or target destinations, the apparatus and/or related system may combine multiple tasks into a single task for purposes of the interleaved set of tasks.

As shown at block 324, the apparatus is 200 may be optionally configured to be capable of generating a control signal causing an indication of the interleaved set of tasks to be displayed on the user interface of the mobile device associated with the network response asset. Any of the approaches to generating a control signal and otherwise causing a set of tasks to be displayed on the user interface of mobile device that may be used in connection with implementations of block 308 and/or block 314 may be used in implementations of block 324. In some example implementations of block 324, it may be particularly advantageous to causing an indication of the interleaved set of tasks to be displayed on the user interface of the mobile device such that an indication of a task associated with the first request data object is rendered in a first color and an indication of a task associated with the second request data object is rendered in a second color. Implementations that contemplate such color coding of tasks, may be particularly advantageous when the selected colors permit the rapid discernment of tasks associated with one request from tasks associated with another request.

Figure 4:
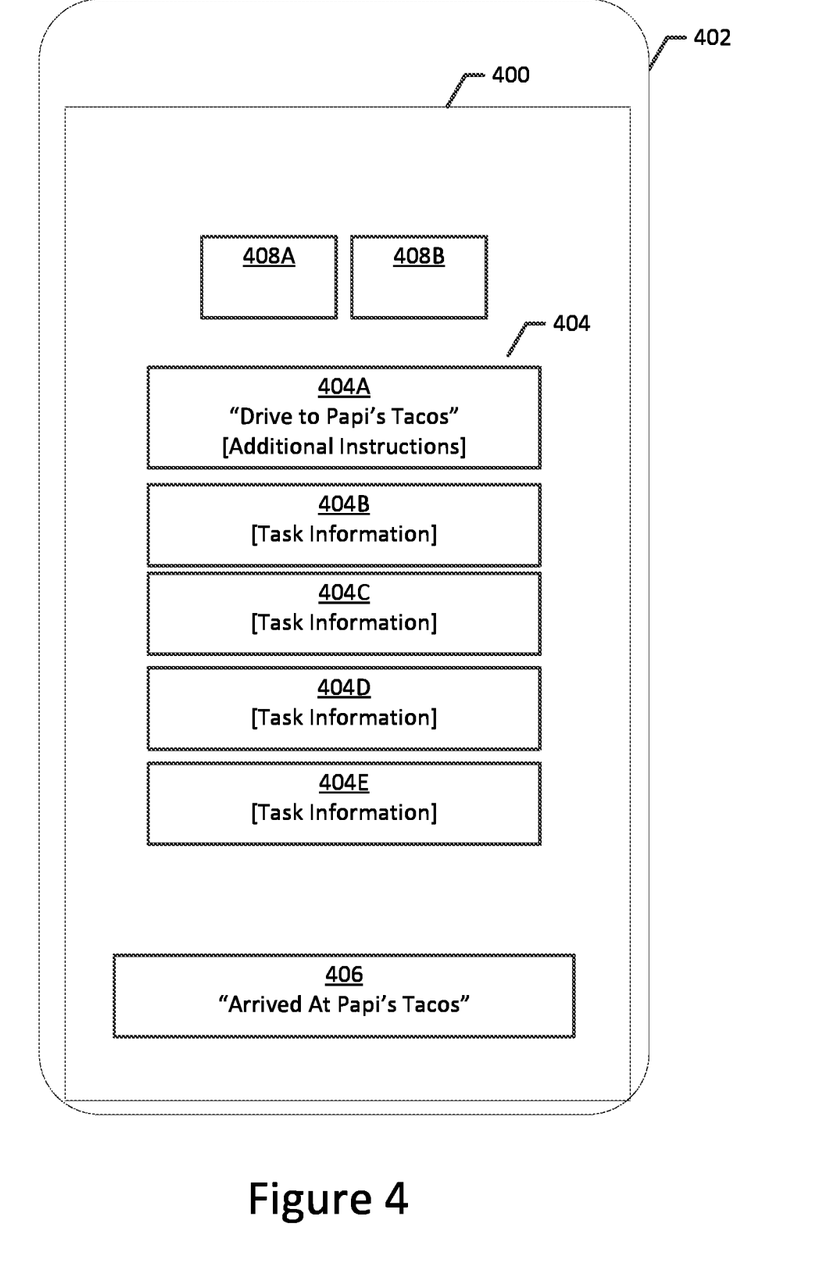
FIG. 4 is a simplified diagram of a display of a user interface that may be generated and used in accordance with an example embodiment of the present invention.

FIG. 4 depicts an example user interface 400 that may be used in accordance with example implementations of embodiments of the invention disclosed herein, including but not limited to process 300. The interface 400 may be presented on, for example, a mobile device 402, such as a mobile phone and/or any the other mobile devices described and/or contemplated herein. In general, example implementations of interface 400, may be performed with any mobile device 402 that is capable of communication with, and displaying data received from the apparatus 200 and/or another system, such as tasking system 102. The mobile device 402 contains an interface 400 that, when displayed via the mobile device 402, displays data, such as data associated with an ordered set of tasks, received from a tasking system. The mobile device 402 may receive data associated with one or more ordered sets of tasks from the tasking system and display the received data so as to present a viewer with a timeline view and/or other view that indicates the next task they should be completed, such as a list of destinations and an action to be performed at each destination.

Task-related data, such as data associated with an ordered set of task, is shown in FIG. 4 as being displayed as a timeline 404 on the user device as depicted as series of items 404A-404E. The depicted timeline 404 shows the current task 404A that should be completed and instructions for completing that task. In the present example, the depicted timeline 404 displays the current task as "Drive to Papi's Tacos." The timeline 404 may also show future and/or previous tasks, such as delivery steps for example. The displayed timeline 404 may be used to detail the order of tasks, such as delivery steps, which the systems associated with a network response agent should perform.

The interface 400 also includes an interactive button 406, which, when selected, may generate response asset input data that indicates that the presently assigned task is completed. Once the system associated with the network response asset has completed the displayed current step of driving to Papi's Tacos, an operator associated with the mobile device 402 (and/or the system associated with the network response asset generally) may select interactive button 406 to indicate that the step has been completed. In some implementations, interactive button 406 may be selected by pressing and/or placing a finger over the button 406. In other example implementations, a move involved gesture may be required, such as swiping motion or other movement that is unlikely to be associated with an accidental touch or other accidental activation.

Once the interactive button 406 is selected, response asset input data indicating that the response asset system has arrived at Papi's Taco is generated and transmitted to the apparatus and/or tasking system using a network connection. The apparatus and/or tasking system may then update the ordered set of tasks based on the received response asset input data and in some instances, the tasking system may send an updated ordered set of tasks to the mobile device 402 such that the displayed timeline 404 may be modified. The interactive button 406 may also indicate that the system associated with the response asset is unable to complete a task. For example, selection of the interactive button 406 may provide an interface control (e.g., a button or other selectable region of a display) that allows an operator associated with mobile device 402 to select that they are unable to complete the task (e.g., an order is not ready at a restaurant destination, or a road is closed and the destination is unreachable, or the system associated with the response asset, such as a vehicle, has been in an accident). In such an instance, when the interactive button 406 is selected, response asset input data is generated indicating that the current task cannot be completed. The response asset input data is received by the apparatus 200 and/or tasking system and, in response, an updated set of ordered tasks is generated and related information is sent to user device 402. For example, the updated set of ordered tasks and related information may recommend that if the system associated with the response asset cannot get to Papi's Tacos in 20 minutes, to abort the delivery.

As shown in FIG. 4, display 400 also may include selectable buttons 408A and 408B. In implementations involving an interleaved set of tasks associated with multiple request data objects, selectable button 408A may be associated with one request data object while selectable button 408B is associated with a different request data object. In views, such as the one depicted in FIG. 4, where the display 400 shows an interleaved set of tasks, selectable buttons 408A and 408B may be rendered in different colors, and the tasks associated with each request data object may be similarly color coded. For example, tasks 404A, 404C, and 404D and selectable button 408A may be associated with one request data object, and rendered one color, while tasks 404B and 404E, along with selectable button 408B may be associated with another request data object, and rendered in another color. In some example implementations, selecting selectable button 408A will cause the display 400 to render only the tasks associated the same request data object as that associated with selectable button 408A. Likewise, selecting selectable button 408B will have a similar effect, causing only the tasks associated with the same request data object as that associated with selectable button 408B.

It will be appreciated that, although the depicted display 400 of a mobile device 402 only displays the timeline 404, the interactive button 406, and the selectable buttons 408A and 408B, it is within the scope of this invention to transmit and/or display any information communicated to and from the mobile device 402, and any related systems, including but not limited to a tasking system, and/or any other system that is capable of communicating with the mobile device 402.

As discussed herein many example implementations of embodiments of the present invention are particularly advantageous in contexts and situations that involve the physical delivery of goods, materials, and/or other resources from one location to another within limited time parameters. In particular several particularly advantageous implementations arise in contexts involving the delivery of food items from an intermediate destination, such as a restaurant, to a target destination, such as a home, business, and/or other location selected by a customer. As such, FIGS. 5-6 and the related discussion herein, include terms and details that may be particularly applicable in such contexts, and serve as particular examples of implementations of embodiments and otherwise disclosed herein:

As used herein, "a routing system" may be a tasking system and/or a portion thereof, which is capable of determining the most efficient way for a delivery driver to complete one or more delivery tasks/steps.

As used herein, the term "order data" refers to any information that describes an order. Order data may be associated with a request data object and/or request parameters, and may be extracted from a request data object or otherwise obtained. For example order data may include, consumer information (e.g. customer location), restaurant information (e.g. restaurant location), make time information (e.g. the time food will be ready for pick up), order creation time (i.e. the time the order was placed), and the like.

As used herein, the term "delivery states" refers to a customizable one or more states that define a delivery process. For example delivery states may include the steps of: assigning a driver to an order, the driver is in route to a restaurant, the driver is picking up food from the restaurant, whether or not the food is ready, the driver is on the way to the customer, the driver is close to the customer, and the delivery is complete.

As used herein, the term "delivery process" refers to a protocol for performing and completing a delivery.

As used herein, the term "delivery steps" refers to an action or other task that when completed moves a delivery process from a previous delivery state to a next delivery state. Some actions are automatically assumed to be completed while others may need to be manually confirmed. For example, if the driver is assigned an order, then it is automatically assumed that the driver is proceeding to the restaurant, and/or the movement of the driver may be verified through the receipt of triangulation location data and/or other positional information obtained from the driver's mobile device. However, in order to move from the state associated with the driver proceeding to the restaurant to the step associated with a driver picking up the food, the driver must typically indicate that he has picked up the food item.

As used herein, the term "timeline data" refers to data that details all the steps that the driver should perform and a particular order that the driver should perform those steps. Timeline data may be used to express a set of ordered tasks, and may take the form of JavaScript Object Notation (JSON) data. Timeline data may be used by a receiving user or consumer device to produce a visual and interactive timeline, such as a display of steps or other tasks to be performed.

As used herein, the term "delivery data" refers to any data that details information about the delivery of an order. Delivery data may be associated with a request data object, a network resource asset and/or a system associated with a network resource asset, and be generated by a user, a customer, a restaurant, a delivery service provider and the like. Delivery data may be data indicating that a delivery step is not yet complete, is in progress, has been completed, or there is an error with completing a delivery step.

As used herein, the term "decision data" refers to data produced by a decision data module that indicates a recommendation of an action to perform. For example, decision data may recommend to a user to abandon the delivery process.

As used herein, the term "delivery service provider" refers to an entity and/or system that is associated with a network resource asset that provides a delivery service and/or the delivery service process.

Timeline Data Calculation

Figure 5:
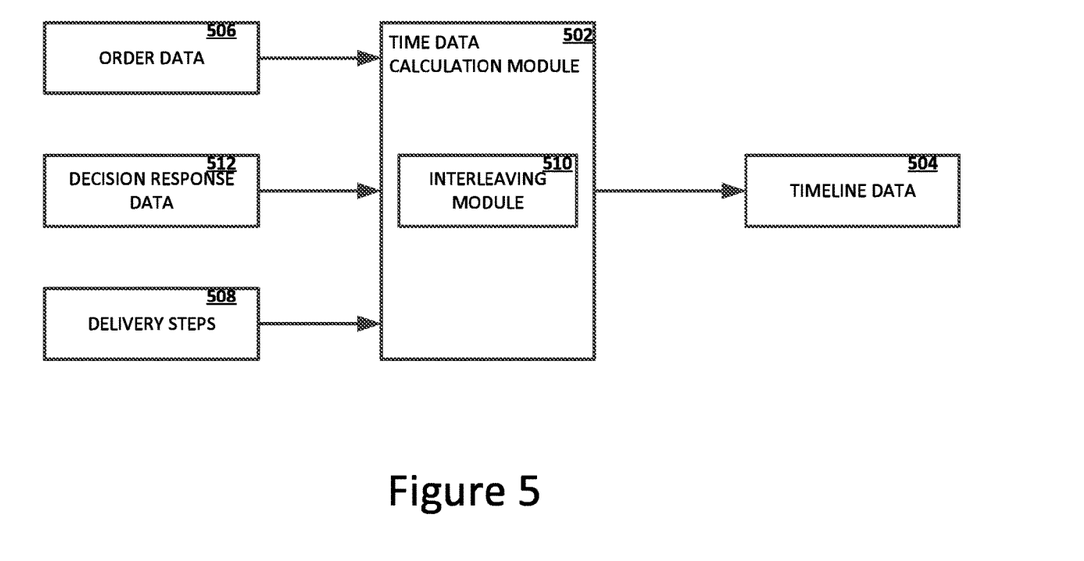
FIG. 5 is a block diagram of an example module that may be specifically configured and combined with other system components in accordance with an example embodiment of the present invention.

FIG. 5 illustrates time data calculation module 502 that may be used with and/or incorporated into the apparatus 200, system environment 100, and the like. To perform an initial calculation of timeline data 504, the time data calculation module 502 first receives an order data set 506 and a set of delivery steps 508. The order data set 506 is generated and transmitted from one or more consumer devices and/or request object systems, such as request object system 104. The order data set 506 may contain one or more data structures defining orders, including a list of goods ordered, a pickup location (i.e., an intermediate destination) for the goods, and a target destination for the goods. The delivery steps 508 represent particular actions associated with all received orders. For example, a food order might include delivery steps of driving to the restaurant, picking up the food, driving to the consumer's home, and delivering the food. Although different orders may, for example, have different pick up and drop off addresses, the fact that a given order includes a pick up action and a drop off action can generally be understood to be static.

The delivery steps 508 function as a framework into which the particular order data set 506 may be input. The interleaving module 510 may identify a series of dispatch objects for the particular order by mapping the details of the order (e.g., pick up location, drop off location, items ordered) onto the set of delivery steps. These dispatch objects represent the particular actions needed to complete the particular order. The interleaving module 510 functions to combine a series of dispatch objects in an efficient manner to generate a timeline that is provided to the mobile device.

The set of order data used by the interleaving module 510 may be all orders assigned to a particular driver. For example, every time an external dispatch system (not shown) assigns an order to a given driver, the set of orders and/or dispatch objects already associated with the driver may be provided to the interleaving module along with any new orders assigned to the driver. In some embodiments, assignment of an order to a driver triggers an event and/or notification that causes a recalculation of the interleaving process and a regeneration of a set of timeline data.

When only one order is received by time data calculation module 502, the computations performed by interleaving module 510 may be simple. For example, when a single order is received, the interleaving module 510 may simply just assign the steps to the received order and output the delivery steps 508 in sequential order as the timeline data 504.

The operation of interleaving module 510 becomes more complex when the order data set 506 includes a plurality of order data sets. When two or more order data sets are received, each order data set has its own set of order data. The interleaving module 510 may generate a separate set of dispatch objects for each order, and then interleave the dispatch objects in an efficient way to generate a new timeline. Interleaving of the dispatch objects may include ordering the dispatch objects according to a shortest path algorithm (e.g., Djikstra's shortest path algorithm), and/or taking into account order dependencies (e.g., a driver cannot drop off a delivery until they have first picked up the object to be delivered). In some example implementations, dispatch objects are interleaved such that all items are picked up before any items are dropped off, though dispatch objects may be interleaved in accordance with any of a number of protocols.

Interleaving module 510 parses both sets of order data into their corresponding components (e.g. consumer identifier, consumer location, restoration location, food order, order creation time) and calculates the particular order of the delivery steps for both sets of order data. In some implementations, interleaving module 510 determines the order of the delivery steps based on an evolving learning algorithm. In other implementations, the interleaving module 510 determines the order of the delivery steps based on a first creation algorithm. For example, in some implementations, order statuses are defined by four separate states: 1) customer order placed, 2) user accepted delivery of order, 3) user picked up the order, and 4) user delivered the order to customer.

In some implementations, there are three decision steps needed to move through the four states to complete the delivery process: to move from state 1 to state 2, (1) the delivery service provider assigns the delivery of an order to a user (i.e., a system associated with a network response asset) and the user accepts, via a user device; to move from state 2 to state 3, (2) the user drives to a restaurant indicated in the order data; to move from state 3 to state 4, (3) the user takes the order to a customer destination indicated in the order data. When receiving two sets of order data (order data set A and order data set B) from two different customers, the interleaving module 510 parses both order data sets into their corresponding components and identifies that order data set A was created first. The parsed data from both data sets is also used to determine important information about delivery steps. For example, order data set A may contain consumer location information and restaurant location information. The restaurant location is used to determine the end location in step 2 and the consumer location information is used to determine the end location in step 3. The first creation algorithm interleaves the decision steps of both order sets such order data A step 1 is to be performed first then order data B step 1 is next, followed by order data A step 2, then order data B step 2, and so forth.

The interwoven decision steps are subsequently output as timeline data 504 and sent to the user device. In another example implementation, steps may be combined if, for example, steps are common (e.g. for step 2 the restaurant for order data A and order data B is the same). In another embodiment, the steps may be interwoven based on shortest distance (e.g. perform order data B step 2 and 3 before order data A step 2 and 3 because the restaurant and customer location for order data B are close to the user's current location). The decisions steps may be interwoven by any efficiency calculation.

The timeline data 504 may be structured as a JSON object which contains information about each dispatch objected associated with the deliveries assigned to the driver and an ordering of those dispatch objects. In response to a change in one or more orders being registered by the server, the JSON object may be regenerated and sent to the mobile device to replace the previous JSON object provided to the mobile device. In this manner, embodiments allow for server-side management of task data to ensure that any change in order status is propagated to the mobile device.

Figure 6:
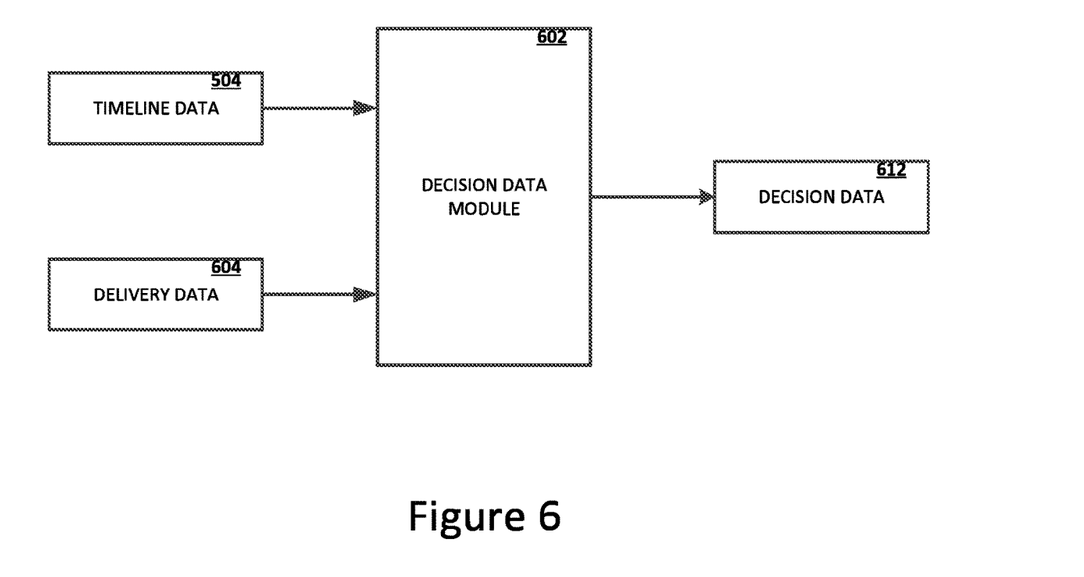
FIG. 6 is a block diagram of an example module that may be specifically configured and combined with other system components in accordance with an example embodiment of the present invention.

Timeline data 504 may be updated or modified based on particular events. When error conditions occur, the timeline data 504 may be updated accordingly. For example, if a driver reaches a merchant and the goods are not ready (e.g., food has not yet been prepared), the driver may utilize a mobile application to notify a decision data module 602 of the error, and the decision data module 602 may determine an optimal course of action (e.g., drop the order to be reassigned to a different driver or wait for the order) based on the expected time to prepare the order, or the like. In response to deciding whether to wait or drop the order, the timeline data 504 may be updated to remove dispatch objects associated with the order or rearrange dispatch objects associated with other orders (or even reassign dispatch objects for other orders to different drivers). The decision data 512 may be received in response to queries or other notifications provided to a mobile device, such as part of a JSON structure sent to the mobile device In some implementations, the timeline data 504 may be updated and retransmitted if an order data set is reassigned to a different driver, an order data set is cancelled, information in order data set is changed (e.g. the customer location for delivery is changed), and/or a new order data set is received.

Data Decision Module (Decision Tree Resolution)

FIG. 6 illustrates the operation of a data decision module 602 that may be used with and/or incorporated into the apparatus 200, system environment 100, and the like. The data decision module 602 is used to calculate decision data 612 that recommends a particular action to a user based on timeline data 504 and delivery data 604. Timeline data 504 has been described above with reference to FIG. 5. Delivery data 604 may be received from any source, including the delivery service provider, a restaurant, a customer, a user, and the like. Delivery data 604 is used to determine the status about one or more delivery steps. For example delivery data 604 may be sent by a restaurant or a user that a food order is not ready. Using the previous example, if a food order is not ready then a user cannot complete delivery step 3 (i.e. the user takes the order to a customer destination indicated in the order data). Delivery data 604 may also include further identifying information including the approximate wait time to complete the delivery step. For example, delivery data that indicates that a food order is not ready may also indicate that the food order will be ready in 30 minutes. The data decision module 602 may have a set of predefined rules that determine the decision data. For example, if the delivery step will take longer than 15 minutes decision data 612 would indicate a recommendation that the user skip that delivery step. Decision data 604 may also be calculated looking by using timeline data 504. Timeline data 504 contains interwoven decision steps to efficiently complete the delivery process of received order sets. Thus, decision data 612 may be calculated by looking at this timeline data in unison with the delivery data 604. For example, timeline data 504 may indicate that user should go to restaurant A then restaurant B, then customer B, then customer A. However, a restaurant may then send delivery data indicating the order for customer A will be delayed by 30 minutes. The data decision module will determine if it is faster to skip restaurant A and return later or if it is faster just to wait the extra 30 minutes. This determination can be made by comparing the time it would take the user to rearrange decision steps (e.g. restaurant B+time from restaurant B to customer B+time from customer B to restaurant A+time from restaurant A to customer A) as compared to the time it would take the user to keep the decision steps+30 minutes. If the rescheduled dispatch object order takes less time the original method then the decision data module 602 may recommend to the user to skip the decision step which caused the error. This decision data is sent to the user device, and the user can decide if he wants to take the recommendation (e.g. select yes or no). The user's device generates decision response data 512 indicating the acceptance or denial of the recommendation in decision data 612. The decision response data is received by the routing system and/or other tasking system.

The interleaving module 510, as described above with respect to FIG. 5, may update the timeline data 504 based on the decision response data 512. In the above example, if decision response data 512 indicates that a driver doesn't mind waiting the extra 30 minutes then timeline data 504 may be updated to indicate the user's acceptance of the wait time, but may not be transmitted to the user device because the original timeline is still valid. On the other hand, if decision response data 512 indicates that the user does not want to wait the 30 minutes then interleaving module 504 will rearrange the interwoven decision steps to a new order to accommodate the user's request.

As described above, FIG. 3 illustrates a flowchart of an apparatus, such as apparatus 200, a method, and a computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor and a memory, the memory comprising instructions that configure the apparatus to:

receive a first request data object;
extract from the first request data object a first set of request parameters, wherein the first set of request parameters comprises:
- a first location identification, wherein the first location identification is associated with a requested intermediate destination;
- a set of request instructions associated with the requested intermediate destination; and
- a second location identification, wherein the second location identification is associated with a requested target destination;

determine, based at least in part on the first set of request parameters, a first ordered set of tasks to be performed by a system associated with a network response asset;
generate a first control signal causing an indication of the first ordered set of tasks to be displayed on a user interface of a mobile device associated with the network response asset;
receive from the mobile device associated with the network response asset a set of response asset input data;
determine, based at least in part on the set of response asset input data and the first set of request parameters, a second ordered set of tasks to be performed by the system associated with the network response asset; and
generate a control signal causing an indication of the second ordered set of tasks to be displayed on the user interface of the mobile device associated with the network response asset;
receive a second request data object;
extract from the second request data object a second set of request parameters;
determine, based at least in part on the second set of request parameters, a third ordered set of tasks associated with the second request data object to be performed by the system associated with the network response asset;
determine an interleaved set of ordered tasks to be performed by the system associated with the network response asset, wherein the interleaved set of ordered tasks comprises at least a portion of the first ordered set of tasks and at least a portion of the third ordered set of tasks associated with the second request data object;
receive delivery data associated with a first task in the interleaved set of ordered tasks, wherein the delivery data is received from the requested intermediate destination associated with the first task in the interleaved set of ordered tasks and wherein the delivery data comprises a first timing parameter, wherein the first timing parameter is associated with a duration required for the requested intermediate destination associated with the first task in the interleaved set of ordered tasks to complete a delivery step associated with the first task in the interleaved set of ordered task;
determine, based at least in part on the first timing parameter, a recommendation of an action regarding the first task in the interleaved set of ordered task to be displayed on the user interface of the mobile device associated with the network response asset, wherein the recommendation requires a decision response from a user accepting or denying the recommendation;
generate a control signal causing an indication of the recommendation to be displayed on the user interface of the mobile device associated with the network response asset;
receive, from the user interface of the mobile device associated with the network response asset, an indication of the decision response associated with an acceptance or denial of the recommendation;
upon receipt of the indication of the decision response associated with the acceptance of the recommendation, reassign at least the first task in the interleaved set of ordered tasks to a second response asset; and
upon receipt of the indication of the decision response associated with the denial of the recommendation, update the interleaved set of ordered tasks to rearrange the interleaved set of ordered tasks.

2. The apparatus of claim 1, wherein the set of response asset input data comprises a triangulation location of the mobile device associated with the network response asset.

3. The apparatus of claim 1, wherein the set of response asset input data comprises an indication of a gestural input received by the mobile device associated with the network response asset.

4. The apparatus of claim 1, wherein the first set of request parameters further comprises a second timing parameter associated with the requested intermediate destination and a third timing parameter associated with the requested target destination.

5. The apparatus of claim 1, the memory further comprising instructions that configure the apparatus to:
generate a control signal causing an indication of the interleaved set of ordered tasks to be displayed on the user interface of the mobile device associated with the network response asset.

6. The apparatus of claim 5, wherein generating the control signal causing an indication of the interleaved set of ordered tasks to be displayed on the user interface of the mobile device associated with the network response asset comprises causing an indication of a task associated with the first request data object to be rendered in a first color and causing an indication of a task associated with the second request data object to be rendered in a second color.

7. A computer program product comprising at least one non-transitory computer-readable storage medium having computer-executable program code instruction stored therein, the computer-executable program code instructions comprising program code instructions configured to:
receive a first request data object;
extract from the first request data object a first set of request parameters, wherein the first set of request parameters comprises:
- a first location identification, wherein the first location identification is associated with a requested intermediate destination;
- a set of request instructions associated with the requested intermediate destination; and
- a second location identification, wherein the second location identification is associated with a requested target destination;

determine, based at least in part on the first set of request parameters, a first ordered set of tasks to be performed by a system associated with a network response asset;
generate a first control signal causing an indication of the first ordered set of tasks to be displayed on a user interface of a mobile device associated with the network response asset;
receive from the mobile device associated with the network response asset a set of response asset input data;
determine, based at least in part on the set of response asset input data and the first set of request parameters, a second ordered set of tasks to be performed by the system associated with the network response asset; and generate a control signal causing an indication of the second ordered set of tasks to be displayed on the user interface of the mobile device associated with the network response asset;

receive a second request data object;

extract from the second request data object a second set of request parameters;

determine, based at least in part on the second set of request parameters, a third ordered set of tasks associated with the second request data object to be performed by the system associated with the network response asset;

determine an interleaved set of ordered tasks to be performed by the system associated with the network response asset, wherein the interleaved set of tasks comprises at least a portion of the first ordered set of tasks and at least a portion of the third ordered set of tasks associated with the second request data object;

receive delivery data associated with a first task in the interleaved set of ordered tasks, wherein the delivery data is received from the requested intermediate destination associated with the first task in the interleaved set of ordered tasks and wherein the delivery data comprises a first timing parameter, wherein the first timing parameter is associated with a duration required for the requested intermediate destination associated with the first task in the interleaved set of ordered tasks to complete a delivery step associated with the first task in the interleaved set of ordered task;

determine, based at least in part on the first timing parameter, a recommendation of an action regarding the first task in the interleaved set of ordered task to be displayed on the user interface of the mobile device associated with the network response asset, wherein the recommendation requires a decision response from a user accepting or denying the recommendation;

generate a control signal causing an indication of the recommendation to be displayed on the user interface of the mobile device associated with the network response asset;

receive, from the user interface of the mobile device associated with the network response asset, an indication of the decision response associated with an acceptance or denial of the recommendation;

upon receipt of the indication of the decision response associated with the acceptance of the recommendation, reassign at least the first task in the interleaved set of ordered tasks to a second response asset; and upon receipt of the indication of the decision response associated with the denial of the recommendation, update the interleaved set of ordered tasks to rearrange the interleaved set of ordered tasks.

8. The computer program product of claim 7, wherein the set of response asset input data comprises a triangulation location of the mobile device associated with the network response asset.

9. The computer program product of claim 7, wherein the set of response asset input data comprises an indication of a gestural input received by the mobile device associated with the network response asset.

10. The computer program product of claim 7, wherein the first set of request parameters further comprises a second timing parameter associated with the requested intermediate destination and a third timing parameter associated with the requested target destination.

11. The computer program product of claim 7, the computer-executable program code instructions further comprising program code instructions configured to:
generate a control signal causing an indication of the interleaved set of ordered tasks to be displayed on the user interface of the mobile device associated with the network response asset.

12. The computer program product of claim 11, wherein generating the control signal causing an indication of the interleaved set of ordered tasks to be displayed on the user interface of the mobile device associated with the network response asset comprises causing an indication of a task associated with the first request data object to be rendered in a first color and causing an indication of a task associated with the second request data object to be rendered in a second color.

13. A method for managing request data objects the method comprising:
receiving a first request data object;
extracting from the first request data object a first set of request parameters, wherein the first set of request parameters comprises:
a first location identification, wherein the first location identification is associated with a requested intermediate destination;
a set of request instructions associated with the requested intermediate destination; and
a second location identification, wherein the second location identification is associated with a requested target destination;
determining, based at least in part on the first set of request parameters, a first ordered set of tasks to be performed by a system associated with a network response asset;
generating a first control signal causing an indication of the first ordered set of tasks to be displayed on a user interface of a mobile device associated with the network response asset;
receiving from the mobile device associated with the network response asset a set of response asset input data;
determining, based at least in part on the set of response asset input data and the first set of request parameters, a second ordered set of tasks to be performed by the system associated with the network response asset; and
generating a control signal causing an indication of the second ordered set of tasks to be displayed on the user interface of the mobile device associated with the network response asset;
receiving a second request data object;
extracting from the second request data object a second set of request parameters;
determining, based at least in part on the second set of request parameters, a third ordered set of tasks associated with the second request data object to be performed by the system associated with the network response asset;
determining an interleaved set of ordered tasks to be performed by the system associated with the network response asset, wherein the interleaved set of ordered tasks comprises at least a portion of the first ordered set of tasks and at least a portion of the third ordered set of tasks associated with the second request data object;
receiving delivery data associated with a first task in the interleaved set of ordered tasks, wherein the delivery data is received from the requested intermediate destination associated with the first task in the interleaved set of ordered tasks and wherein the delivery data comprises a first timing parameter, wherein the first timing parameter is associated with a duration required for the requested intermediate destination associated with the first task in the interleaved set of ordered tasks to complete a delivery step associated with the first task in the interleaved set of ordered task;

determining, based at least in part on the first timing parameter, a recommendation of an action regarding the first task in the interleaved set of ordered task to be displayed on the user interface of the mobile device associated with the network response asset, wherein the recommendation requires a decision response from a user accepting or denying the recommendation;

generating a control signal causing an indication of the recommendation to be displayed on the user interface of the mobile device associated with the network response asset;

receiving, from the user interface of the mobile device associated with the network response asset, an indication of the decision response associated with an acceptance or denial of the recommendation;

in a circumstance in which the indication of the decision response is associated with the acceptance, reassigning at least the first task in the interleaved set of ordered tasks to a second response asset; and in a circumstance in which the indication of the decision response is associated with the denial, updating the interleaved set of ordered tasks to rearrange the interleaved set of ordered tasks.

14. The method of claim 13, wherein the set of response asset input data comprises a triangulation location of the mobile device associated with the network response asset.

15. The method of claim 13, wherein the set of response asset input data comprises an indication of a gestural input received by the mobile device associated with the network response asset.

16. The method of claim 13, wherein the first set of request parameters further comprises a second timing parameter associated with the requested intermediate destination and a third timing parameter associated with the target destination.

17. The method of claim 13, the method further comprising:

generating a control signal causing an indication of the interleaved set of ordered tasks to be displayed on the user interface of the mobile device associated with the network response asset, wherein generating the control signal causing an indication of the interleaved set of ordered tasks to be displayed on the user interface of the mobile device associated with the network response asset comprises causing an indication of a task associated with the first request data object to be rendered in a first color and causing an indication of a task associated with the second request data object to be rendered in a second color.

* * * * *